United States Patent [19]

Band

[11] Patent Number: 4,477,587

[45] Date of Patent: Oct. 16, 1984

[54] SUPPORTED CATALYST FOR POLYMERIZATION OF OLEFINS

[75] Inventor: Elliot I. Band, Yonkers, N.Y.

[73] Assignee: Stauffer Chemical Company, Westport, Conn.

[21] Appl. No.: 451,627

[22] Filed: Dec. 20, 1982

[51] Int. Cl.$^3$ .............................. C08F 4/64; C08F 4/68
[52] U.S. Cl. .................................... 502/111; 502/121; 502/123; 502/124; 502/125; 502/127; 526/125
[58] Field of Search ............... 502/125, 127, 111, 123, 502/124, 121

[56] References Cited

U.S. PATENT DOCUMENTS

| | | | |
|---|---|---|---|
| 3,135,809 | 6/1964 | Bosmajian | 502/103 X |
| 4,105,847 | 8/1978 | Ito et al. | 502/125 X |
| 4,283,515 | 8/1981 | Gibbs | 502/111 X |
| 4,295,992 | 10/1981 | Gibbs | 502/111 X |
| 4,335,016 | 6/1982 | Dombro | 502/125 X |

*Primary Examiner*—Patrick Garvin
*Attorney, Agent, or Firm*—Vivienne T. White

[57] ABSTRACT

This invention comprises a catalytic component for polymerizing olefins comprising a solid support containing magnesium-halogen bonds, a transition metal halide of a metal selected from Groups IVB and VB of the periodic table, and an electron donor obtained by the steps comprising:

(a) reacting an organometallic compound whose metal comprise members of Groups I to III of the periodic table with an alcohol, ROH, where R is an alkyl, cycloalkyl, or arylalkyl moiety having 1 to 16 carbon atoms, a polysiloxane, and a transition metal halide to form a solid;

(b) treating the solid with a transition metal halide optionally in the presence of a polysiloxane to form a treated solid; and (c) reacting the treated solid with an electron donor and a transition metal halide to form the component.

18 Claims, No Drawings

SUPPORTED CATALYST FOR POLYMERIZATION OF OLEFINS

BACKGROUND OF THE INVENTION

This invention relates to the polymerization of olefins by the coordinate complex method, often termed the Ziegler-Natta method after the names of the two workers who contributed so much to its practical development and theoretical basis. More particularly, this invention relates to novel, activated supports for the transition metal catalytic component.

About 30 years ago the original Ziegler-Natta catalysts were heterogeneous slurries formed in place when solutions of organometallic cocatalysts, preferably taken from the compounds of metals of Groups IA, IIA, and IIIA of the periodic table, were added to solutions of transitional metal catalysts, preferably taken from compounds of metals of Groups IIIB, IVB, and VB of the periodic table. These catalytic systems by today's standards did not have high activity in terms of grams polyolefins produced per gram catalyst component. Nor, when propylene or other monomers capable of giving polymers with tacticity were employed, did these early catalytic systems provide polymer with high isotactic index. Also, the particle size distribution of the polyolefin was too broad, leading to an undesirable fraction of "fines", particles less than about 100–180 μm.

More recently, high activity, high isotactic index, and enhanced particle size have been achieved by employing catalyst supports on which catalytic transition metals have been dispersed. It has been theorized that the concentration of active polymerization centers is as much as 50 percent higher on supported catalysts than unsupported catalyst systems. These developments are discussed in the Kirk-Othmer "Encyclopedia of Chemical Technology", third edition, vol 16, pp. 453–469 in an article entitled Olefin Polymers (Polypropylene) and in Angewandte Makromolekulare Chemie, 94, 63–89 (1981). One support which has gained favor in technical circles is magnesium halide, particularly in an activated condition. The preferred method for activating catalyst support such as magnesium halide is dry milling, as disclosed in British Pat. No. 1,335,887.

Dry milling suffers from many practical defects. Among these are long milling regimes, losses of support by "hold-up" in the milling equipment, excessive handling, the cost of milling energy, and a wide dispersion of the particle size of the milled products leading to excessively broad particle size distribution of the polyolefin. It would be advantageous to have the high catalytic activity of a supported catalyst, the high isotacticity of polymers capable of such (e.g., polypropylene) and a decreased proportion of "fines" without the necessity of a milling or grinding step. This is achieved by use of the present invention.

European Patent Application 14,523 published Aug. 20, 1980 discloses a component of a polymerization catalyst for olefins prepared by treating a solid inorganic oxide (e.g., silica, alumina, or magnesia) with a dialkylmagnesium compound, a halogenating agent, an electron-donor, and titanium tetrachloride either simultaneously or sequentially.

U.S. Pat. No. 4,295,992 discloses a catalyst for the polymerization of olefins prepared by the reaction of an alcohol with a mixture of an organomagnesium compound and silicon tetrachloride to form a support. This support is further reacted with titanium tetrachloride and a dialkylaluminum chloride.

French Pat. No. 2,373,565 discloses the reaction of a Grignard reagent complex with an alcohol, which is then caused to react with titanium tetrachloride and an electron donor such as ethyl benzoate.

OBJECTS OF THE INVENTION

It is an object of this invention to prepare a supported, active, catalytic component for polymerizing olefins, alone or in mixtures, to polymers of high stereoregularity without employing a milling or grinding step. Other objects of the invention will be apparent to those skilled in the art.

SUMMARY OF THE INVENTION

Surprisingly, it has been found that an effective, supported, catalytic component for coordinate complex (Ziegler-Natta) polymerization of olefins, such as propylene, results from the following process:

(a) reacting an organometallic compound whose metal comprises members of Groups I to III of the periodic table with an alcohol, optionally a polysiloxane, and a transition metal halide to form a solid containing magnesium-halogen bonds, (b) treating the solid with a transition metal halide, optionally in the presence of the polysiloxane, to form a treated solid containing magnesium-halogen bonds, (c) reacting the treated solid with an electron-donor and a transition metal halide to form the catalytic component.

In step (c) reaction with the electron donor and the transition metal halide may be carried out simultaneously or sequentially.

DETAILED DESCRIPTION OF THE INVENTION

The first step (a) in the process for preparing the novel catalyst of the present invention involves the use of three liquid reagents to form the solid support containing magnesium halogen bonds material on which the catalyst will be dispersed. The three reagents are (1) an organometallic compound whose metal becomes the cation in the support material, (2) a transition metal halide which becomes in part the catalyst and in part the anionic component of the solid, and (3) and oxygenated, active-hydrogen compound to react with the organometallic compound to precipitate the cationic part of the solid. Optionally a silicon-containing polymer, such as a polysiloxane, may be present to incorporate an electron donor onto or into the solid.

The preferred organometallic compounds are dialkylmagnesiums. Trialkylaluminums or other organometallics may also be employed singly or in mixtures. That is organo derivatives of zinc, mercury, cadmium, manganese, gallium, indium, thallium, calcium, barium, strontium, and beryllium are useful. Fluid organic derivatives of Groups IIA and IIIA metals alone or as mixtures, such as MAGALA ® organometallics may be used.

The organic moieties of the organometallic compounds may be alkyl, cycloalkyl, aryl, or halogenated derivatives of hydrocarbyl groups. One or more of the hydrocarbyl groups may be replaced by a halogen such as chlorine or bromine, as long as the compound itself, is a liquid or can be dissolved in an inert liquid such as a hydrocarbon solvent. The preferred organic moieties are alkyls containing from 2 to 16 carbon atoms. The preferred inert solvents are aliphatic or aromatic hydrocarbons, such as heptane or toluene. Halogenated hydrocarbon solvents may also be used.

The alcohol employed to react with the organometallic compound to form, in part, metallic alkoxides is preferably a straight-chain alcohol having from 1 to 16 carbon atoms. Cyclo- or arylalkyl-derivatives, such as cyclohexanol or benzyl alcohol, may also be employed. Longer chain alkanol groups keep the metallic alkoxides dissolved in the hydrocarbon solvent longer, hence they are preferred. Octanol and nonanol are examples of the preferred, more solubilizing alcohols. Shorter-chain alkanols such as ethanol or butanol are also useful.

The third reagent in the first step, forming the solid support, is a fluid transition metal halide. Titanium is the preferred transition metal, and titanium tetrahalide the preferred reagents. Other transition metal compounds containing halogen may be employed, such as full or partial halides of vanadium, zirconium, or niobium. The preferred compounds are chlorine-containing compounds of metals from Groups IVB and VB of the periodic table.

The transition metal halide plays at least two roles, halogenating agent and source of catalyzing cation. Examples of preferred specific titanium halide compounds which may be used are: $TiCl_4$, $TiBr_4$, $TiI_4$, $Ti(OC_3H_7)Cl_3$, $Ti(OC_6H_5)Cl_3$, $Ti(OC_4H_9)_2Cl_2$, $Ti[OC(CH_3)=CHCOCH_3]Cl_2$, $Ti[N(C_2H_5)_2]Cl_3$, and $Ti(C_6H_5COO)Cl_3$. Analogous halogen-metal compounds of vanadium, zirconium, niobium, or other Group IVB or VB metals may also be useful.

It is not necessary to know the chemistry of the reactions in the first step or to know the chemical formula of the precipitating solid in order to practice the present invention. It is advantageous to add the third reagent, the transition metal halide, a few minutes after the reaction between the alcohol and the organometallic compound, but that is not necessary. The transition metal halide may be present at the commencement of the reaction, in part or totally. It is generally accepted, but not proven, that the alcohol first reacts with the organometallic compound to form a metal alkoxide, which is then partially halogenated by the transition metal halide.

The order of addition of the reagents is not crucial to the formation of the support solid containing magnesium-halogen bonds. It is advantageous, however, to add one reagent slowly to the complete amount of the other. The alcohol may be added incrementally to the organometallic reagent in an inert solvent, or vice versa. It is also advantageous to add the transition metal halide incrementally over a period of one-half to three hours to the reaction suspension.

The temperature of the reaction of the first step may vary from about ambient to about 250° C., but temperatures over 100° C. are preferred. The total reaction time for the first step may be varied from about one-half to about four hours. A total time for mutual reaction of the three reagents vary from about one to about two hours is preferred. Optionally, an unreactive electron donor such as a polysiloxane may be added during formation and halogenation of the magnesium-halogen containing solid support. It is advantageous to add a polysiloxane after initial formation of the suspension (alcohol plus organometallic compound) but before the addition of the transition metal halide (e.g., $TiCl_4$). Preferably the reaction mixture is allowed to cool during the addition of the polysiloxane.

Preferably, after the initial solid has been formed in the first step, it is separated from the reaction mixture, washed with inert solvent, and vacuum-dried. This is not necessary for the practice of the present invention, however.

The second step (b) of the preparation of the catalyst of the present invention is a further treatment with transition metal halide. Preferably this step is carried out separately upon a separated, washed, and dried solid, but this step (b) can be combined with the first step. The same or a different transition metal halide may be employed as in the first step (a). Optionally, the unreactive electron donor, such as a polysiloxane, may be added during step (b) rather than during step (a). It is unnecessary, however, to add the unreactive electron donor during both step (a) and step (b).

The further reaction with the transition metal without the presence of organometallic compound or alcohol, step (b), may be carried out in neat reagent or in a solution of the transition metal halide. Suitable inert solvents are hydrocarbons or halogenated hydrocarbons such as toluene, xylenes, or chlorobenzene. Stable non-hydrocarbons, such as benzonitrile or diphenyl ether, may also be used.

The temperature of reaction step (b) may vary from about 60° to about 200° C.; the range from about 80° to about 150° C. is preferred. Inversely with temperature, the reaction time for reaction step (b) may vary from about one-half to about five hours. A reaction time of about two to about three hours is preferred. At the conclusion of reaction step (b) it is advantageous to separate the catalytic solid from the reaction mixture, wash it with inert, low-boiling solvent, such as heptane, and dry it under reduced pressure.

Once a treatment step has been carried out with an organometallic reagent as in step (a), the catalyst intermediate is sensitive to moisture and the oxygen in air. Therefore, it should be kept and handled in an inert atmosphere thereafter. Dry nitrogen or argon are examples of inert gases. Use of a gloved dry box is convenient for handling and storage of the catalyst or intermediates at each stage of their preparation.

Normally the same transition metal is employed for step (b) as chosen for step (a), but not necessarily. For the same or different transition metal, the same halide reagent or another of the specific halide reagents specified for step (a) may be employed for step (b). Titanium tetrachloride is the preferred reagent for both steps.

The third step (c) in the preparation of the catalyst of the present invention is advantageous but not necessary, namely further treatment with a reactive electron donor and a transition metal halide, either sequentially or simultaneously. The term "reactive electron donor" refers to those classes of electron donors which might react with organometallic reagents and therefore can not be employed in step (a). The preferred class of reactive electron donors is aromatic carboxylic esters. Specific examples of the preferred class of electron donors for step (c) are ethyl benzoate, methyl toluate, and ethyl anisate. Other reactive classes of electron donors for step (c) are amines, organic acids, organic acid chlorides, amides, phosphines, and ketones or aldehydes.

It is preferable that the same transition metal be employed in step (c) as in step (a) and in step (b) but this is not necessary. The transition metal and/or the transition metal halide reagent could be different in all three steps. Normally the same transition metal and the same transition metal halide reagent is employed throughout the entire preparation of the catalyst. The preferred reagent is titanium tetrachloride. The preferred transition metal is titanium. Other specific examples of titanium halide reagents which may be used are: $TiBr_4$, $TiI_4$, $Ti(OC_3H_7)Cl_3$, $Ti(OC_6H_5)Cl_3$, $Ti(OC_4H_9)_2Cl_2$, $Ti[O(CH_3)=CHCOCH_3]Cl_2$, $Ti[N(C_2H_5)_2]Cl_3$ and $Ti(C_6H_5COO)Cl_3$.

Each reagent in step (c), the electron donor and the transition metal halide, may be employed neat singly, neat together, in an inert solvent singly or in an inert solvent together. Suitable inert solvents are hydrocarbons or halogenated hydrocarbons such as toluene, xylenes, or chlorobenzene. Whether step (c) is carried out with both reagents together or sequentially, reaction time can vary from about one-half hour to about five hours per segment. Preferably each segment of the reaction is about two to about three hours. The reaction may be carried out at a temperature from about 60° to about 200° C., the range from about 80° to about 150° C. is preferred.

If reaction step (c) is carried out sequentially in two stages: treatment with electron donor and reaction with transition metal halide, it is advantageous to isolate, wash with inert solvent, and vacuum-dry the catalytic intermediate between the stages. If reaction (c) is carried out with both reagents simultaneously, it is also advantageous to isolate, wash with inert solvent, and vacuum-dry the catalyst before use. The final product, as the intermediates, should be stored in a moisture-free, oxygen-free atmosphere at ambient or cool temperature.

The product of the present invention will normally contain from about one percent to about ten percent by weight of transition metal.

The catalytic component of the present invention is broadly applicable to the polymerization of monomeric olefins including 1-olefins such as ethylene and propylene, dienes, especially conjugated dienes such as butadiene, and those other olefins which are only polymerized with difficulty, such as 2-butene. The preferred monomeric olefins are those corresponding to the formula $R-C=CH_2$, wherein R is an alkyl radical containing up to 12 carbon atoms inclusive and hydrogen. Among the preferred monomeric olefins are ethylene, propylene, 1-butene, 1,4-butadiene, 1-pentene, 4-methyl-1 pentene, 1-hexene, and the like. These monomers may be employed individually or in comonomeric mixtures such as ethylene/propylene, ethylene/propylene/butadiene, and the like. The term "monomeric olefin" means those olefins which can undergo addition polymerization alone or with comonomers.

Although for illustrating the present invention, the polymerization of propylene is described herein as an example, the invention is by no means limited to any one monomeric olefin.

The organometallic compound for the necessary cocatalyst, may be an organometallic compound known to those skilled in the art of coordinate complex polymerization as useful. Included are organocompounds of zinc, mercury, magnesium, cadmium, boron, gallium and other metals of Groups IA, IIA, and IIIA of the periodic table of elements. The preferred organometallic compounds are those of aluminum, especially trialkylaluminums.

The molar ratio of trialkyl aluminum or other cocatalyst to the novel catalyst of the present invention may range from about 1000:1 to about 1:1, preferably about 200:1 to about 10:1.

An electron donor may be employed in the cocatalyst component with the organometallic compound. Oxygen compounds are preferred donors especially alkyl esters of aromatic carboxylic esters. Methyl toluate, ethyl anisate, ethyl benzoate, and dibutyl phthalate, are examples of such preferred electron donors (Lewis bases) for the cocatalyst component.

The electron donor employed in conjunction with the cocatalyst may be advantageously used in a molar ratio from about 1:15 to about 1:1 with respect to the cocatalyst (e.g., trialkylaluminum).

After having described the preparation of the novel polymerization catalyst of the present invention above, the following Examples illustrate but do not limit its utility. Many variations of these Examples can be carried out by those skilled in the art of coordination complex polymerization within the scope of this invention.

EXAMPLE 1

This Example illustrates a preparation of the catalyst of the present invention.

Dropwise 16.5 ml of 1-octanol was added at 110° C. to 65 ml of 0.8M di (n-butyl)magnesium in 350 ml dry, degassed heptane. After cooling, 3.5 silicone oil (General Electric Co. SF96-100) was added followed by dropwise addition of 10 ml titanium tetrachloride. The reaction mixture was then reheated to reflux for 10 minutes and cooled. After separation by filtration, one wash with heptane, and vacuum drying, 13.5 g yellow, granular solid was isolated.

A 10-g. aliquot of this solid was treated with 80 ml neat $TiCl_4$ at 128° C. for 1-½ hrs. cooled, filtered, washed four times with heptane and vacuum-dried to yield 5.6 g pinkish orange free-flowing powder, termed catalyst 1A, treated solid.

A 4-g aliquot of catalyst 1A treated solid was then caused to react with 2 ml ethyl benzoate in 100 ml heptane for two hours at 110° C. After cooling, filtration, heptane-wash, and vacuum-drying 4.4 g beige treated solid was isolated, termed catalyst 1B.

A 3.35-g aliquot of catalyst 1B was then caused to react with 50 ml neat titanium tetrachloride at 110° C. for one and one-half hours, filtered hot, washed four times with heptane, and vacuum-dried yielding a dark brown powder, termed catalyst 1C.

EXAMPLE 2

This Example illustrates the use of the catalytic component of the present invention to polymerize propylene by the slurry method.

The novel component containing titanium is air and moisture sensitive. Thus during preparation, storage, and use it should be kept in an inert atmosphere (e.g., nitrogen, argon) containing less than 5 ppm oxygen and less than 5 ppm moisture. The preferred cocatalyst methyl toluate or ethyl anisate are hydroscopic and should also be handled in a moisture-free environment. All reagents shold be of polymerization grade.

Into a 4.5 L. stirred reactor equipped with a heater, means for temperature control, gas inlet and outlet lines are added in order 2 L. heptane, 12 mmole triethylaluminum, 0.54 g of methyl p-toluate, 30 mg of the novel catalyst prepared in Example 1, and 3.2 psi (1/5 atmosphere) of hydrogen as a polymerization moderator. The reactor is stirred at 600 rpm, held at 65° C. Then the monomer-grade propylene is introduced and maintained at 10 atmospheres for 1.5 hours, whereupon this polymerization is topped by venting the gases and pouring the contents of the reactor into alcohol. Filtering and vacuum-drying steps are carried out in the usual manner.

Catalytic activity is defined as the grams of total polymer produced both soluble and insoluble in the polymerization medium per gram of catalytic component. For catalyst 1A the activity was 3414. For catalyst 1B the activity was 491. For catalyst 1C the activity was 4756.

Isotactic Index is defined as the weight percent of the total polymer produced which is insoluble in refluxing heptane after three hours. For the polymer made by catalyst 1A this was 85.4 percent; for the polymer made by the catalyst 1B the value was 82.7 percent. For the polymer made by catalyst 1C the value was 89.8.

It is seen that it is more advantageous to end preparation of a catalyst of the present invention with a treatment with $TiCl_4$ than with only an electron donor.

EXAMPLE 3

This Example illustrates another embodiment of the present invention.

Into a stirred, three-liter vessel flushed with nitrogen was added 250 ml toluene and 21 ml (0.125 m) 1-nonanol with heating to reflux. Then 66 ml 0.8 m $(C_4H_9)_2$ Mg plus 4 ml 27 weight percent $(C_2H_5)_3Al$, both in heptane, were added dropwise over ½ hour at reflux yielding a clear solution. Then 5 ml silicone oil (General Electric Co. SF95-100) was added. While maintaining the temperature at reflux, 75 ml $TiCl_4$ was added dropwise over two hours. The reaction was continued at reflux for 1.5 hours. After cooling, separation by filtration, and washing six times with heptane a wet, red solid was obtained. An aliquot was vacuum-dried and designated catalyst 3A.

The remaining solid 3A was then treated with 100 ml $TiCl_4$ neat at reflux for 2.5 hours, cooled, filtered, washed four times with heptane, and vacuum dried to form 4.6 g of treated solid 3B colored brown.

A 2-g aliquot of treated solid 3B was then simultaneously caused to react with with 50 ml neat $TiCl_4$ and 0.5 ml ethyl benzoate at 130° C. for two hours. After cooling, filtering, washing four times with heptane, and vacuum-drying 1.6 g of catalyst component 3C, colored dark brown, was isolated.

Following the procedure of Example 2 the catalysts 3A, 3B, and 3C were evaluated in a slurry polymerization of propylene with the following results:

| Sample | Activity g PP/g cat. | Isotactic Index |
|--------|---------------------|-----------------|
| 3A     | 2598                | 73.4            |
| 3B     | 3683                | 73.6            |
| 3C     | 6496                | 83.3            |

It is seen that step (b) and step (c) of the process of the present invention improve either activity of the catalyst, stereoregularity of the polymeric product, or both.

EXAMPLE 4

This Example illustrates another embodiment of the invention wherein use of a short chain alcohol results in an initial slurry, not a clear solution, in step (a) of the present invention.

The same procedure was followed as in Example 3 except that 0.125 m ethanol was employed in place of the longer chain alcohol of Example 3. The reaction mixture was thus never a clear solution. As in Example 3, three successive catalytic intermediates were isolated and designated 4A, 4B, and 4C.

These catalytic solids, treated solids, and catalytic components were evaluated in a slurry polymerization of propylene, as in Example 2, to yield the following results:

| Sample | Activity g PP/g cat. | Isotactic Index |
|--------|---------------------|-----------------|
| 4A     | 2728                | 70.8            |
| 4B     | 3473                | 78.2            |
| 4C     | 4289                | 79.7            |

It is seen that although the intermediate products are comparable, the final treated catalyst component from a soluble solid support in step (a) yields a superior catalytic component.

EXAMPLE 5

This Example illustrates the good particle size distribution of polyolefins produced from the catalytic component of the present invention.

Extracted polypropylene prepared as in Example 2, employing the catalytic component of Example 3, was wet-sieved in ethanol by the procedure of ASTM STP 447A (1977) to give the distribution of particle size by weight. The results are given below:

| Particle Size Distribution | |
|---|---|
| Size (μm) | Weight Percent |
| <45 | 1.46 |
| 45–75 | 0.83 |
| 75–180 | 4.47 |
| 180–425 | 16.22 |
| 425–850 | 30.67 |
| 850–1700 | 44.80 |
| >1700 | 1.55 |

One sees that the total "fines", particles less than 180 μm, totals only 6.8 weight percent.

COMPARATIVE EXAMPLE 1

This Comparative Example illustrates the inferior results obtained when steps (a) and (b) are carried out at ambient rather than elevated temperatures.

By the general procedure of Example 1 an 65-ml solution of 0.81M dibutylmagnesium in heptane and 4 ml, 25 weight-percent heptane solution of triethylaluminum was added dropwise to 21 ml 1-nonanol at reflux with agitation yielding a clear solution. Then 5 ml silicone oil (General Electric Co. SF 95-100) was added and the solution allowed to cool to ambient temperature. Upon cooling a suspension formed and the entire mass became highly viscous, greater than 10,000 cps.

At room temperature 50 ml neat $TiCl_4$ was rapidly added with agitation, causing a color change to orange, and a marked decrease in viscosity. After the mass stood for one day at room temperature, a portion of solid was separated by centrifugation. This solid aliquot was washed twice with toluene, twice with heptane, and vacuum-dried for two hours, yielding 1.85 g light orange powder, which was sieved through a 120-mesh screen. This sample was designated CE-1A.

The remaining solid from the preceding paragraph was separated by centrifugation and washed twice with toluene. To the wet cake of solid, containing about 50 ml toluene, was added 50 ml neat TiCl$_4$, and the mixture allowed to remain at ambient temperature for three days. Then an aliquot of the solid was separated from the reaction mixture by filtration, washed twice with heptane, and vacuum-dried yielding 0.65 g of orange catalytic component. This sample was designated CE-1B.

By the method of Example 2 both CE-1A and CE-1B were separately employed in a polymerization of propylene. Each component showed an activity of less than 200 g PP/g. catalyst. Isotactic index was not determined.

The present invention having been illustrated but not limited by the Examples above, the inventor asserts that other variations can be carried out within the scope of this disclosure, which he seeks to protect by the following claims for letters patent.

I claim:

1. A catalytic component for polymerizing olefins comprising a solid support containing magnesium-halogen bonds, a transition metal halide of a metal selected from Groups IVB and VB of the periodic table, and an electron donor obtained by the steps comprising:
    (a) reacting in liquid states at least one organometallic compound whose metal comprise members of Group I to Group III of the periodic table and in which at least one of the metals must be magnesium, with an alcohol, ROH, where R is an alkyl, cycloalkyl, or arylalkyl moiety having 1 to 16 carbon atoms, a polysiloxane, and a transition metal halide to form a solid;
    (b) treating the solid with a transition metal halide to form a treated solid; and
    (c) reacting the treated solid with an electron donor and a transition metal halide to form the component.

2. A catalytic component as in claim 1 wherein the transition metal is titanium.

3. A catalytic component as in claim 1 wherein the electron donor is a carboxylic ester.

4. A catalytic component as in claim 1 wherein the halogen and the halide are chlorine and chloride.

5. A catalytic component as in claim 1 wherein the organometallic compound comprises magnesium and aluminum.

6. A catalytic component as in claim 1 wherein reaction step (c) is carried out with the electron donor and the transition metal halide sequentially.

7. A catalytic component as in claim 1 wherein reaction step (c) is carried out with the electron donor and the transition metal halide simultaneously.

8. A catalytic component as in claim 1 wherein step (b) is carried out in the presence of a polysiloxane.

9. A catalytic component as in claim 1 wherein the organometallic compound comprises magnesium, the transition metal halide is titanium tetrachloride, and the electron donor is ethyl benzoate.

10. A process for preparing a catalyst for polymerizing olefins comprising the steps of:
    (a) reacting in liquid states at least one organometallic compound whose metal comprise members of Groups I to III of the periodic table and in which at least one of the metals must be magnesium with an alcohol, ROH, where R is an alkyl, cycloalkyl, or arylalkyl moiety having 1 to 16 carbon atoms, a polysiloxane, and a transition metal halide to form a solid;
    (b) treating the solid with a transition metal halide to form a treated solid; and
    (c) reacting the treated solid with an electron donor and a transition metal halide to form the component.

11. A process as in claim 10 wherein the transition metal is titanium.

12. A process as in claim 10 wherein the electron donor is a carboxylic ester.

13. A process as in claim 10 wherein the halide is chloride.

14. A process as in claim 10 wherein the organometallic compound comprises magnesium and aluminum.

15. A process as in claim 10 wherein reaction step (c) is carried out with the electron donor and the transition metal halide sequentially.

16. A process as in claim 10 wherein reaction step (c) is carried out with the electron donor and the transition metal halide simultaneously.

17. A process as in claim 10 wherein the organometallic compound comprises magnesium, the transition metal halide is titanium tetrachloride, and the electron donor is ethyl benzoate.

18. A process as in claim 10 wherein step (b) is carried out in the presence of a polysiloxane.

* * * * *

UNITED STATES PATENT AND TRADEMARK OFFICE
CERTIFICATE OF CORRECTION

PATENT NO. : 4,477,587
DATED : October 16, 1984
INVENTOR(S) : Elliot I. Band

It is certified that error appears in the above—identified patent and that said Letters Patent is hereby corrected as shown below:

Col. 3, line 62, "vary" should be -- varying --;

Col. 5, line 8, "Ti[N($C_2H_5$)$_2$]$Cl_3$" should be --Ti[N($C_2H_5$)$_2$]$Cl_3$--

Col. 5, line 44, "R-C=$CH_2$" should be -- R-CH=$CH_2$ --;

Col. 6, line 60, "shold" should be -- should --.

Signed and Sealed this

Sixth Day of August 1985

[SEAL]

Attest:

DONALD J. QUIGG

Attesting Officer     Acting Commissioner of Patents and Trademarks